(12) United States Patent
Funk et al.

(10) Patent No.: US 8,617,495 B1
(45) Date of Patent: Dec. 31, 2013

(54) EXHAUST GAS AFTERTREATMENT DESULFURIZATION CONTROL

(71) Applicant: GM Global Technology Operations LLC, Detroit, MI (US)

(72) Inventors: Sarah Funk, Canton, MI (US); Rebecca J Darr, Milford, MI (US); Paul Jasinkiewicz, Northville, MI (US); Amr Radwan, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/671,889

(22) Filed: Nov. 8, 2012

(51) Int. Cl.
*B01D 53/94* (2006.01)
*F01N 3/18* (2006.01)
*G05B 13/00* (2006.01)

(52) U.S. Cl.
USPC ........ 423/212; 423/213.2; 502/501; 502/514; 60/277; 60/295; 60/299; 422/105; 422/108; 700/271

(58) Field of Classification Search
USPC .......... 423/212, 213.2; 502/501, 514; 60/277, 60/295, 299; 422/105, 108; 700/271
See application file for complete search history.

(56) References Cited

U.S. PATENT DOCUMENTS

| | | | | |
|---|---|---|---|---|
| 6,338,831 B1 * | 1/2002 | Strehlau et al. | ........... | 423/244.07 |
| 6,854,266 B2 * | 2/2005 | Schnaibel et al. | ............... | 60/295 |
| 7,769,533 B2 * | 8/2010 | Audouin et al. | ............... | 701/108 |
| 8,074,447 B2 * | 12/2011 | Scherer et al. | .................. | 60/295 |
| 8,109,080 B2 * | 2/2012 | Gabe et al. | ....................... | 60/286 |
| 2008/0022667 A1 * | 1/2008 | Scherer et al. | .................. | 60/290 |
| 2008/0104942 A1 * | 5/2008 | Wills | .............. | 60/274 |
| 2008/0104947 A1 * | 5/2008 | Wang et al. | ..................... | 60/295 |
| 2010/0055012 A1 * | 3/2010 | Grisstede et al. | .......... | 423/213.5 |
| 2010/0064665 A1 * | 3/2010 | Eckhoff et al. | ................ | 60/284 |
| 2010/0233051 A1 * | 9/2010 | Grisstede et al. | .......... | 423/213.5 |
| 2012/0137662 A1 * | 6/2012 | Lee et al. | ........................ | 60/286 |

* cited by examiner

*Primary Examiner* — Timothy Vanoy
(74) *Attorney, Agent, or Firm* — Cantor Colburn LLP

(57) ABSTRACT

An exhaust gas treatment system for an internal combustion engine to control desulfurization of at least one aftertreatment device is provided. The exhaust gas treatment system includes a desulfurization mode trigger module, a desulfurization control module, and an interrupt module. The desulfurization mode trigger module is configured to set a desulfurization request based on one or more trigger conditions. The desulfurization control module is configured to control desulfurization of at least one aftertreatment device based on the desulfurization request. The interrupt module is configured to interrupt the desulfurization of at least one aftertreatment device based on an interrupt condition.

19 Claims, 3 Drawing Sheets

EXHAUST GAS AFTERTREATMENT DESULFURIZATION CONTROL

FIELD OF THE INVENTION

Exemplary embodiments of the present invention relate to exhaust gas treatment systems for internal combustion engines and, more particularly, to an exhaust gas treatment system for controlling desulfurization of at least one aftertreatment device.

BACKGROUND

Exhaust gas emitted from an internal combustion engine, particularly a diesel engine, is a heterogeneous mixture that contains gaseous emissions such as, but not limited to, carbon monoxide ("CO"), unburned hydrocarbons ("HC") and oxides of nitrogen ("$NO_x$") as well as condensed phase materials (liquids and solids) that constitute particulate matter ("PM"). Catalyst compositions, typically disposed on catalyst supports or substrates, are provided in an engine exhaust system as part of an aftertreatment system to convert certain, or all of these exhaust constituents into non-regulated exhaust gas components.

One type of exhaust treatment technology for reducing CO and HC emissions is an oxidation catalyst ("OC") device. The OC device includes a flow-through substrate and a catalyst compound applied to the substrate. One type of exhaust treatment technology for reducing $NO_x$ emissions is a selective catalytic reduction ("SCR") device that may be positioned downstream of the OC device. The SCR device includes a flow-through substrate, having a SCR catalyst compound applied to the substrate.

During operation of the engine, the components of the aftertreatment system are exposed to sulfur from the fuel as well as the engine oil that are consumed by the engine. Over time as the sulfur accumulates, this affects the performance of the SCR catalyst as well as the oxidation catalyst. The sulfur is released from the catalysts of the OC device and the SCR device at relatively high temperatures (e.g., typically about 500° C. or greater), resulting in desulfurization. Accordingly, it is desirable to control desulfurization of various exhaust gas aftertreatment devices to maintain aftertreatment system performance.

SUMMARY OF THE INVENTION

In one exemplary embodiment, an exhaust gas treatment system for an internal combustion engine to control desulfurization of at least one aftertreatment device is provided. The exhaust gas treatment system includes a desulfurization mode trigger module, a desulfurization control module, and an interrupt module. The desulfurization mode trigger module is configured to set a desulfurization request based on one or more trigger conditions. The desulfurization control module is configured to control desulfurization of at least one aftertreatment device based on the desulfurization request. The interrupt module is configured to interrupt the desulfurization of at least one aftertreatment device based on an interrupt condition.

In another exemplary embodiment, a method for controlling desulfurization of at least one aftertreatment device in an exhaust gas treatment system of an internal combustion engine is provided. A desulfurization request is initiated based on one or more trigger conditions. Desulfurization of at least one aftertreatment device is controlled based on the desulfurization request. The desulfurization of at least one aftertreatment device can be interrupted based on an interrupt condition.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
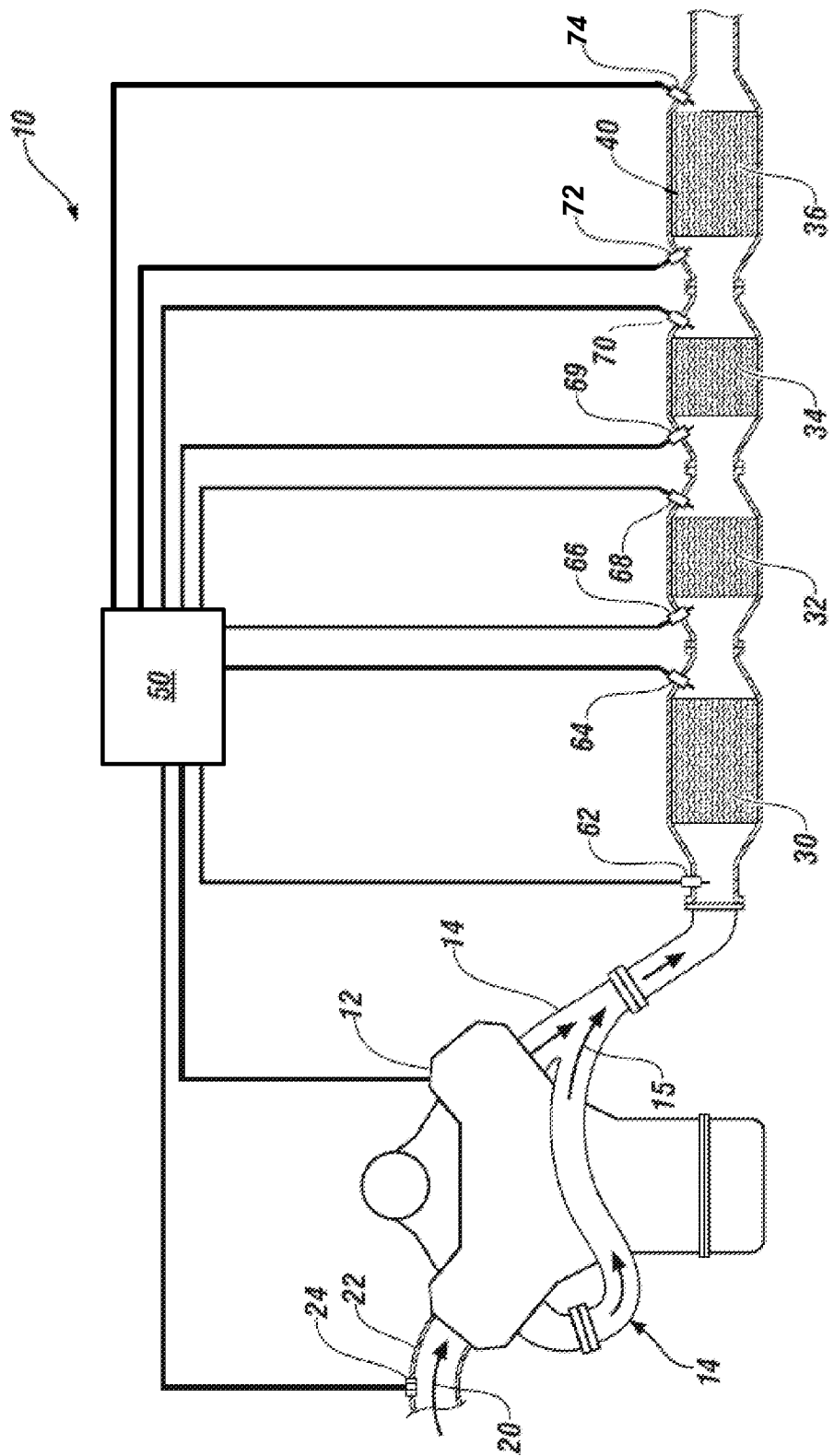
FIG. 1 is a schematic diagram of an exhaust gas treatment system in accordance with exemplary embodiments.

The following description is merely exemplary in nature and is not intended to limit the present disclosure, its application or uses. It should be understood that throughout the drawings, corresponding reference numerals indicate like or corresponding parts and features. As used herein, the term "module" refers to an application specific integrated circuit (ASIC), an electronic circuit, a processor (shared, dedicated, or group) and memory that executes one or more software or firmware programs, a combinational logic circuit, and/or other suitable components that provide the described functionality. When implemented in software, a module can be embodied in memory as a non-transitory machine-readable storage medium readable by a processing circuit and storing instructions for execution by the processing circuit for performing a method.

Referring now to FIG. 1, an exemplary embodiment is directed to an exhaust gas treatment system 10 for an internal combustion (IC) engine 12. The engine 12 is configured to receive an intake air 20 from an air intake passage 22. The intake air passage 22 includes an intake mass air flow sensor 24 for determining the intake air mass of the engine 12. In one embodiment, the intake mass air flow sensor 24 may be either a vane meter or a hot wire type intake mass air flow sensor; however, it is to be understood that other types of sensors may be used as well. An exhaust gas conduit 14, which may comprise several segments, transports exhaust gas 15 from the engine 12 to various aftertreatment devices of the exhaust gas treatment system 10.

The exhaust gas treatment system 10 described herein can be implemented in various engine systems that may include, but are not limited to, diesel engine systems, gasoline engine systems, and homogeneous charge compression ignition engine systems. In the exemplary embodiment as illustrated, aftertreatment devices of the exhaust gas treatment system 10 include a first oxidation catalyst ("OC") device 30, a selective catalytic reduction ("SCR") device 32, a second OC device 34, and a particulate filter ("PF") device 36. As can be appreciated, the exhaust gas treatment system of the present disclosure may include various combinations of one or more of the aftertreatment devices shown in FIG. 1, and/or other aftertreatment devices (e.g., lean $NO_x$ traps), and is not limited to the present example.

The first OC device 30 and the second OC device 34 may both include, for example, a flow-through metal or ceramic monolith substrate that is packaged in a stainless steel shell or canister having an inlet and an outlet in fluid communication with exhaust gas conduit 14. The substrate can include an oxidation catalyst compound disposed thereon. The oxidation catalyst compound may be applied as a wash coat and may contain platinum group metals such as platinum ("Pt"), palladium ("Pd"), rhodium ("Rh") or other suitable oxidizing catalysts, or combinations thereof. The OC devices 30 and 34 are useful in treating unburned gaseous and non-volatile HC and CO, which are oxidized to form carbon dioxide and water.

The SCR device 32 may be disposed downstream of the first OC device 30 and upstream of the second OC device 34. In a manner similar to the OC devices 30 and 34, the SCR device 32 may include, for example, a flow-through ceramic or metal monolith substrate that may be packaged in a stainless steel shell or canister having an inlet and an outlet in fluid communication with the exhaust gas conduit 14. The substrate may include an SCR catalyst composition applied thereto. The SCR catalyst composition may contain a zeolite and one or more base metal components such as iron ("Fe"), cobalt ("Co"), copper ("Cu") or vanadium ("V") which can operate efficiently to convert $NO_x$ constituents in the exhaust gas 15 in the presence of a reductant such as ammonia.

The PF device 36 may be disposed downstream of the SCR device 32 and the second OC device 34. The PF device 36 operates to filter the exhaust gas 15 of carbon and other particulates. In various embodiments, the PF device 36 may be constructed using a ceramic wall flow monolith filter 40 that may be packaged in a shell or canister constructed of, for example, stainless steel, and that has an inlet and an outlet in fluid communication with exhaust gas conduit 14. The ceramic wall flow monolith filter 40 may have a plurality of longitudinally extending passages that are defined by longitudinally extending walls. The passages include a subset of inlet passages that have an open inlet end and a closed outlet end, and a subset of outlet passages that have a closed inlet end and an open outlet end. Exhaust gas 15 entering the filter 40 through the inlet ends of the inlet passages is forced to migrate through adjacent longitudinally extending walls to the outlet passages. It is through this wall flow mechanism that the exhaust gas 15 is filtered of carbon and other particulates. The filtered particulates are deposited on the longitudinally extending walls of the inlet passages and, over time, will have the effect of increasing the exhaust gas backpressure experienced by the engine 12. It is appreciated that the ceramic wall flow monolith filter is merely exemplary in nature and that the PF device 36 may include other filter devices such as wound or packed fiber filters, open cell foams, sintered metal fibers, etc. The increase in exhaust backpressure caused by the accumulation of particulate matter in the monolith filter 40 typically requires that the PF device 36 is periodically cleaned, or regenerated. Regeneration involves the oxidation or burning of the accumulated carbon and other particulates in what is typically a high temperature environment (>600° C.).

A control module 50 is operably connected to and monitors the engine 12 and the exhaust gas treatment system 10 through a number of sensors. FIG. 1 illustrates the control module 50 in communication with the engine 12, the intake mass air flow sensor 24, first and second temperature sensors 62 and 64 for determining the temperature profile of the first OC device 30, third and fourth temperature sensors 66 and 68 for determining the temperature profile of the SCR device 32, fifth and sixth temperature sensors 69 and 70 for determining the temperature profile of the second OC device 34, and seventh and eighth temperature sensors 72 and 74 for determining the temperature profile of the PF device 36.

The control module 50 determines an amount of sulfur that is stored on at least one aftertreatment device (e.g., the first OC device 30, the SCR device 32, and the second OC device 34) since a previous or last desulfurization cycle. The desulfurization cycle may be initiated by the control module 50 based on a variety of triggering conditions as further described herein. During the desulfurization cycle, the first OC device 30, the SCR device 32, and the second OC device 34 are subjected to elevated temperatures (generally above about 500° C.) to release sulfur stored on the catalyst. In the exemplary embodiment as shown, the control module 50 includes control logic for determining the amount of sulfur that is stored on the first OC device 30, the SCR device 32, and the second OC device 34, as well as monitoring a number of trigger conditions for desulfurization. It is to be understood that various combinations and arrangements of aftertreatment devices (e.g., OC devices and/or SCR devices) may be used as well depending on the configuration of the exhaust gas treatment system 10.

In one embodiment, the control module 50 is configured to account for elevated temperature effects of regeneration of the PF device 36 in making control decisions for aftertreatment device desulfurization. For example, temperature setpoints and duration for post injection controlled aftertreatment device desulfurization can correct for PF device regeneration impact on desulfurization, particularly where aftertreatment devices (e.g., the OC devices and the SCR devices) are located proximate to the PF device 36 such that the aftertreatment devices are generally subjected to elevated temperatures created during regeneration of the PF device 36. This is because at least a portion of the sulfur stored in all of the aftertreatment devices (e.g., the OC device and the SCR device) can be released during regeneration of the PF device 36. As a result, determining the amount of sulfur stored on the aftertreatment devices may not be necessary.

In one embodiment, the control module 50 includes control logic for calculating an exhaust mass flow located within the exhaust gas conduit 14. The exhaust mass flow is based on the intake air mass of the engine 12, which is measured by the intake air mass airflow sensor 24 as well as a fuel mass flow of the engine 12. Specifically, the exhaust mass flow is calculated by adding the intake air mass of the engine 12 and the fuel mass flow of the engine 12. The fuel mass flow is measured by summing the total amount of fuel injected into the engine 12 over a given period of time (e.g., since the last desulfurization cycle). The fuel mass flow is added to the air mass flow rate to calculate the exhaust mass flow of the engine 12.

Figure 2:
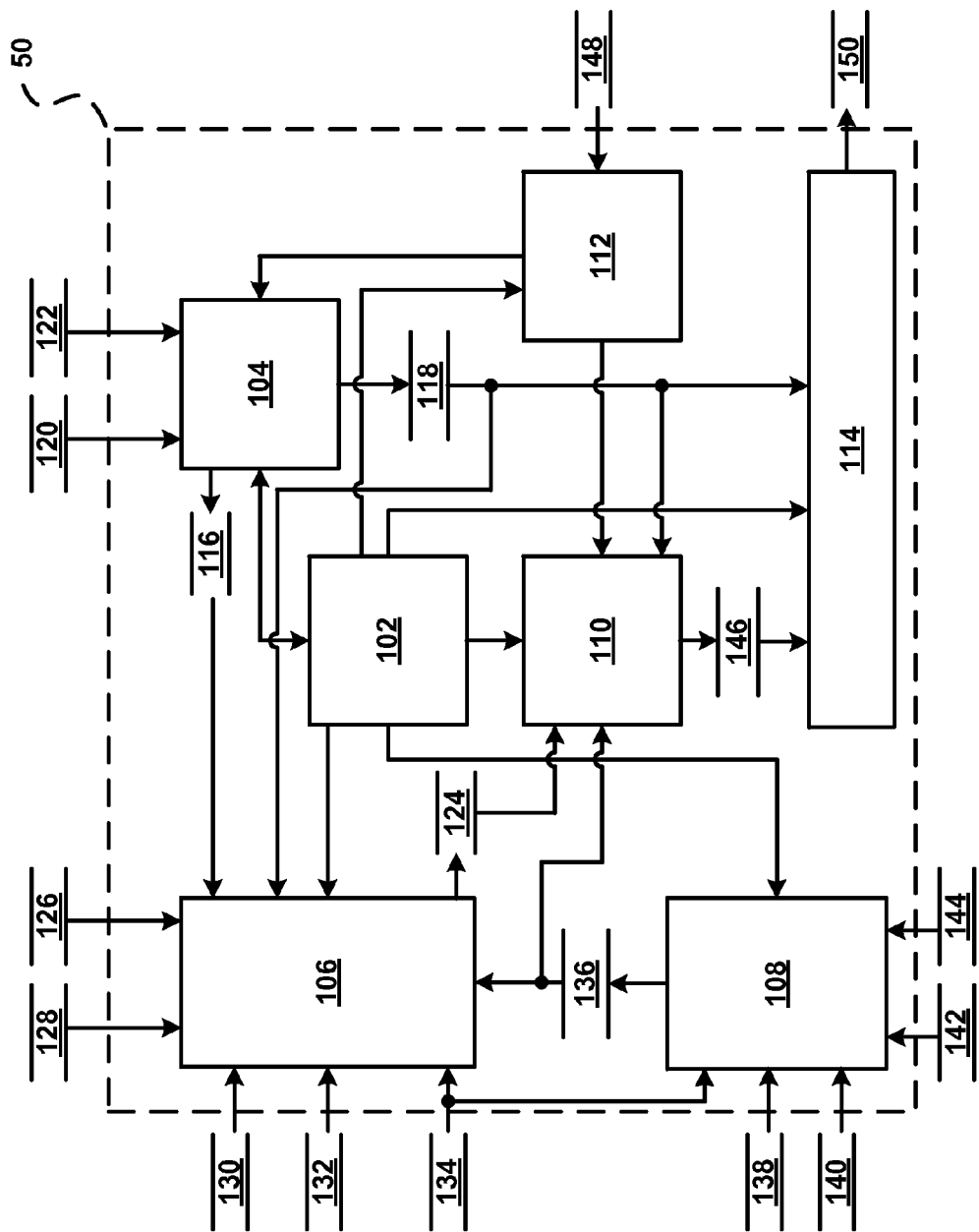
FIG. 2 is a dataflow diagram of a control module shown in FIG. 1 in accordance with exemplary embodiments.

FIG. 2 is an illustration of a dataflow diagram that illustrates various elements that may be embedded within the control module 50. Various embodiments of the exhaust gas treatment system 10 of FIG. 1 according to the present disclosure may include any number of sub-modules embedded within the control module 50. As can be appreciated, the sub-modules shown in FIG. 2 may be combined or further partitioned as well. Inputs to the control module 50 may be sensed from the exhaust gas treatment system 10, received from other control modules (not shown), or determined by other sub-modules or modules. In the embodiment as shown in FIG. 2, the control module 50 includes a memory 102, a regeneration control module 104, a desulfurization mode trigger module 106, a stored sulfur model 108, a desulfurization control module 110, an interrupt module 112, and a fuel injection control module 114.

In one embodiment, the memory 102 of the control module 50 stores a number of configurable limits, maps, and variables that are used to control desulfurization of aftertreament devices, such as the first OC device 30, the SCR device 32, and the second OC device 34 of FIG. 1, as well as regeneration of the PF device 36 of FIG. 1. Each of the modules 104-114 interfaces with the memory 102 to retrieve and update stored values as needed. For example, the memory 102 can provide values to the regeneration control module 104 for supporting determination of a soot load 116 and thresholds for determining a regeneration mode 118 based on vehicle operating conditions 120 and exhaust conditions 122. The memory 102 can also store a number of PF device regenerations initiated by the regeneration control module 104.

The regeneration control module 104 may apply algorithms known in the art to determine when to set the regeneration mode 118. For example, the regeneration mode 118 may be set when the soot load 116 exceeds a threshold defined in the memory 102. Regeneration of the PF device 36 of FIG. 1 can be based on or limited according to vehicle operating conditions 120 and exhaust conditions 122. The vehicle operating conditions 120 and the exhaust conditions 122 can be provided by sensors or other modules. For example, the seventh and eighth temperature sensors 72, 74 (shown in FIG. 1) send electrical signals to the control module 50 to indicate a temperature profile of the PF device 36. Factors such as engine speed, exhaust temperature, time elapsed since a last regeneration, distance traveled since a last regeneration, and a modeled soot level can also be used to determine when the regeneration mode 118 should be set.

The desulfurization mode trigger module 106 is configured to set a desulfurization request 124 based on one or more trigger conditions. The trigger conditions can be defined relative to a number of parameters and threshold values. The desulfurization mode trigger module 106 can receive the soot load 116, the regeneration mode 118, an engine operating time 126, a distance traveled 128, a pending SCR performance fault 130, an elapsed regeneration time 132, an amount of fuel consumed 134, and a total amount of sulfur stored 136. The engine operating time 126, distance traveled 128, and amount of fuel consumed 134 can be determined by monitoring the engine 12 of FIG. 1. The pending SCR performance fault 130 can be received from a separate SCR diagnostic (not depicted) as part of overall diagnostics for the exhaust gas treatment system 10. The elapsed regeneration time 132 may be determined by timing transitions of the regeneration mode 118 or can be received as a value from the memory 102 or the regeneration control module 104. The total amount of sulfur stored 136 is received from the stored sulfur model 108. The desulfurization mode trigger module 106 also retrieves values from the memory 102 to determine trigger conditions, such as: an upper sulfur threshold, an engine operating time threshold, a fuel consumption threshold, a distance traveled threshold, a regeneration time threshold, a soot load threshold, and the number of PF device regenerations.

The stored sulfur model 108 determines the total amount of sulfur stored 136 based on the amount of fuel consumed 134, an amount of oil consumed 138, an exhaust temperature value 140, a mass adsorbed value 142, an exhaust mass flow 144, and parameters from the memory 102. The parameters from the memory 102 can include a sulfur exposure from fuel value, a sulfur exposure from oil value, and a capture rate value. The sulfur exposure from fuel value is a calibratable scalar value that is based on the nominal value of an amount of sulfur that is generally found in the fuel of the engine 12 of FIG. 1. The sulfur exposure from oil value is also a calibratable scalar value that is based on the nominal value of the amount of sulfur that is generally found in the oil of the engine 12 of FIG. 1. The sulfur exposure from fuel value and the sulfur exposure from oil value may depend on specific regulations, and are expressed in units of mass concentration such as, for example, milligrams per liter.

The capture rate value is a value that represents an amount of sulfur that is actually transmitted to the exhaust gas conduit 14 (shown in FIG. 1) and stored on an aftertreatment device. That is, the exhaust aftertreatment system 10 is exposed to a portion of the sulfur present in the fuel and oil that the engine 12 has consumed during operation, which is the capture rate value. In one embodiment, the capture rate value may be determined by testing of the catalyst wash coat of the first OC device 30, the SCR device 32, and the second OC device 34 (e.g., chemical analysis of the exhaust gas that enters and exits the first OC device 30 and the SCR device 32).

The stored sulfur model 108 is configured to determine a total amount of sulfur in at least one aftertreatment device as a combined sulfur adsorption and desorption value. As described in U.S. patent application Ser. No. 13/423,617, filed Mar. 19, 2012 to Funk et al., entitled "SYSTEM FOR DETERMINING SULFUR STORAGE OF AFTERTREATMENT DEVICES", and incorporated by reference in its entirety, the total amount of sulfur 136 can be determined as a rate of sulfur adsorption of the first OC device 30, the SCR device 32, and the second OC device 34 (shown in FIG. 1) during a sulfur adsorption cycle and a rate of sulfur desorption when exposed to elevated temperatures (generally over about 500° C.). Sulfur adsorption occurs any time during operation of the engine 12 when the aftertreatment devices are not releasing sulfur during a desulfurization cycle.

The amount of fuel consumed 134 and the amount of oil consumed 138 can be determined by monitoring operation of the engine 12 since the last desulfurization cycle. That is, the amount of fuel consumed 134 represents the cumulative sum of fuel consumed by the engine 12 since the last desulfurization cycle. Likewise, the amount of oil consumed 138 represents the cumulative sum of oil consumed by the engine 12 since the last desulfurization cycle. Both the amount of fuel consumed 134 and the amount of oil consumed 138 are reset after each desulfurization cycle.

The exhaust temperature value 140 may include the temperature profiles of aftertreatment devices such as the first OC device 30, the SCR device 32, and the second OC device 34. Specifically, in one embodiment, the first and second temperature sensors 62, 64 (shown in FIG. 1) send electrical signals to the control module 50 that indicate the temperature profile of the OC device 30, the third and fourth temperature sensors 66, 68 (shown in FIG. 1) send electrical signals to the control module 50 that indicate the temperature profile of the SCR device 32, and the fifth and sixth temperature sensors 69, 70 (shown in FIG. 1) send electrical signals to the control module 50 that indicate the temperature profile of the second OC device 34. Alternatively, in another embodiment, the control module 50 may include control logic for determining the temperature profiles of the first OC device 30, the SCR device 32, and the second OC device 34 based on operating parameters of the engine 12 (shown in FIG. 1).

The mass adsorbed value 142 is a value calculated by the control module 50, and represents the amount of sulfur that is already adsorbed on the first OC device 30, the SCR device 32, and the second OC device 34 (shown in FIG. 1). The mass adsorbed value 142 is a time integrated value of the amount of sulfur adsorbed (e.g., for example at time=0 seconds, there is generally no sulfur adsorbed, but 10 g/s sulfur entering into the catalyst, at time=1 seconds, there are 10 g of sulfur now adsorbed by the catalyst). The sulfur exposure from the fuel value, the sulfur exposure from oil value, the capture rate value, the amount of fuel consumed value 134, the amount of oil consumed 138, the exhaust temperature value 140, and the mass adsorbed value 142 are used to calculate the rate of sulfur adsorption.

The exhaust mass flow 144 is based on the intake air mass of the engine 12 (measured by the intake air mass airflow sensor 24 shown in FIG. 1) and the fuel mass flow of the engine 12. Alternatively, the input 144 into the stored sulfur model 108 may be the exhaust gas space velocity, which is measured in units of inverse time (e.g., generally 1/hour). The exhaust gas space velocity is the volumetric flow rate of the exhaust gas 15 divided by the volume of the catalyst.

The desulfurization control module 110 is configured to control desulfurization of at least one aftertreatment device of FIG. 1 based on the desulfurization request 124 received from the desulfurization mode trigger module 106. The desulfurization control module 110 outputs a desulfurization mode 146 to the fuel injection control module 114 for controlling desulfurization. The desulfurization control module 110 receives the regeneration mode 118 from the regeneration control module 104, the total amount of sulfur 136 from the stored sulfur model 108, and parameters from the memory 102. The desulfurization control module 110 can also receive an interrupt from the interrupt module 112. Using the regeneration mode 118, the desulfurization control module 110 can initiate desulfurization concurrently with or immediately succeeding regeneration of the PF device 36 in the exhaust gas treatment system 10 of FIG. 1.

The desulfurization mode 146 may be set until the interrupt module 112 interrupts the desulfurization, the total amount of sulfur 136 is less than a lower sulfur threshold read from memory 102, or a desulfurization duration elapses. Based on an interrupt condition 148, the desulfurization is halted and prevented from resuming until a next regeneration of the PF device 36 or a next desulfurization request 124 is received. Interrupt conditions 148 may be temperature based and can use one or more of the temperature sensors 62-74 compared relative to one or more temperature threshold values stored in the memory 102. For example, a sensed temperature above about 800° C. may result in an interrupt. Other temperature values, such as a coolant temperature of engine 12 of FIG. 1 can also be monitored by the interrupt module 112. The interrupt generated by the interrupt module 112 can be sent to either or both of the regeneration control module 104 and the desulfurization control module 110.

The fuel injection control module 114 outputs a fuel injection control signal 150 to control in cylinder post injection in the engine 12 of FIG. 1. In cylinder post injection generates exhaust temperatures to remove stored sulfur from one or more aftertreatment devices and/or for regeneration of the PF device 36 of FIG. 1. The fuel injection control module 114 can access values in the memory 102 to set the fuel injection control signal 150 based on the regeneration mode 118 and the desulfurization mode 146. The memory 102 may include a separate desulfurization temperature setpoint map and a correction map to an in cylinder post injection quantity for PF device 36 regeneration. The desulfurization mode 146 may use existing combustion control software for in cylinder post injection DPF regeneration. Using existing combustion control software in combination with separate temperature setpoints and a correction map reduces an amount of the memory 102 required to implement the desulfurization mode 146 with respect to existing combustion control software for the regeneration mode 118.

Figure 3:
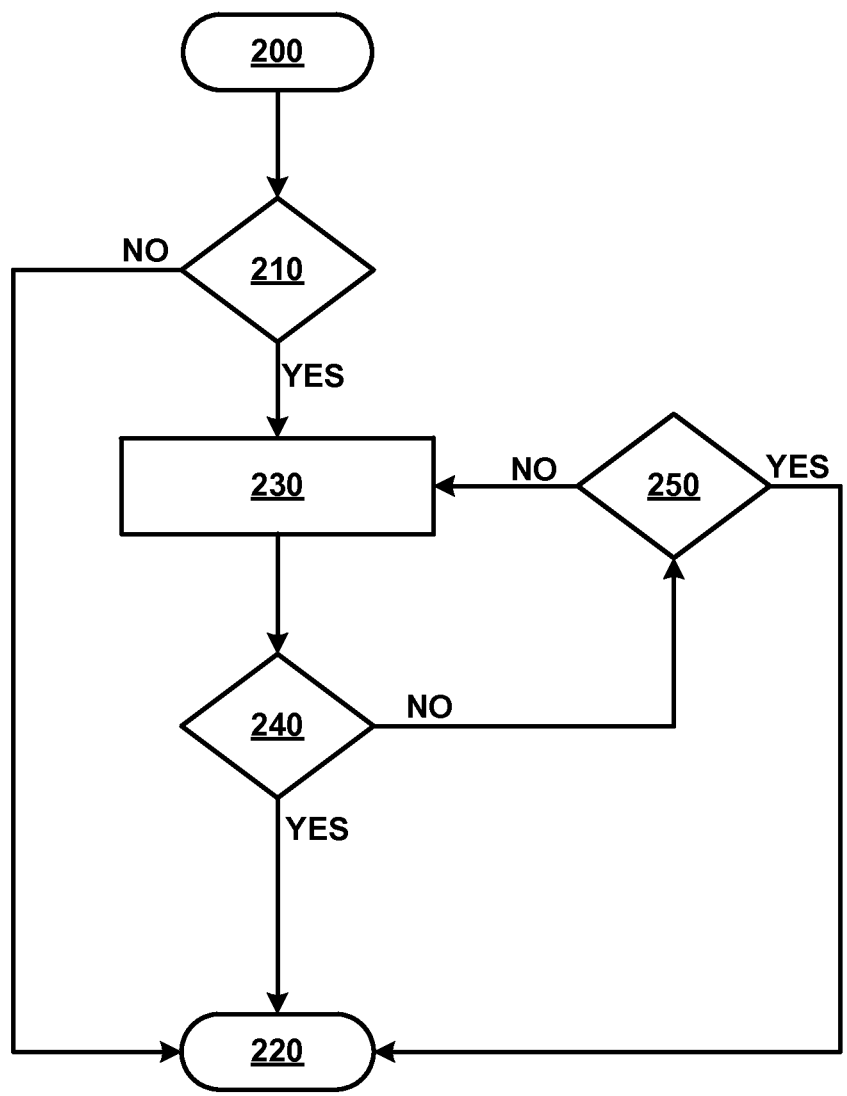
FIG. 3 is a flowchart illustrating an exhaust gas aftertreatment desulfurization control method that may be performed in the exemplary exhaust gas treatment system in accordance with exemplary embodiments.

Turning to FIG. 3, and with continued reference to FIGS. 1 and 2, a flowchart illustrates a method for controlling desulfurization of at least one aftertreatment device in an exhaust gas treatment system of an internal combustion engine that can be performed by the control module 50 of FIG. 1 in accordance with the present disclosure. The aftertreatment devices can include one or more of the first OC device 30, the SCR device 32, and the second OC device 34 as shown in FIG. 1. As can be appreciated in light of the disclosure, the order of operation within the method is not limited to the sequential execution as illustrated in FIG. 3, but may be performed in one or more varying orders as applicable and in accordance with the present disclosure.

In various embodiments, the method can be scheduled to run based on predetermined events, and/or run continually during operation of the engine 12.

In one example, the method may begin at block 200. At block 210, the desulfurization mode trigger module 106 checks trigger conditions to determine whether to set the desulfurization request 124. The desulfurization mode trigger module 106 sets the desulfurization request 124 based on determining one or more of whether: the engine operating time 126 exceeds an engine operating time threshold; the distance traveled 128 exceeds a distance traveled threshold; a pending SCR performance fault 130 is detected; the amount of fuel consumed 134 exceeds a fuel consumption threshold; the total amount of sulfur 136 exceeds an upper sulfur threshold; or a number of PF device 36 regenerations exceeds a regeneration threshold. If the regeneration mode 118 is set, the desulfurization request 124 may be set based on one or more of the elapsed regeneration time 132 exceeding a regeneration time threshold and the soot load 116 of the PF device 36 exceeding a soot load threshold as trigger conditions. If a trigger condition is not detected, the method terminates at block 220; otherwise, the method proceeds to block 230.

At block 230, the desulfurization control module 110 controls desulfurization of at least one aftertreatment device based on the desulfurization request 124. The desulfurization control module 110 sets the desulfurization mode 146 and may initiate the desulfurization concurrently with or immediately succeeding regeneration of PF device 36 as detected by the regeneration mode 118. The desulfurization control module 110 can schedule the desulfurization to occur based on a subsequent regeneration of the PF device 36 after the desulfurization request 124. The desulfurization mode 146 is used by the fuel injection control module 114 to select an associated desulfurization temperature setpoint map and a correction map from the memory 102 for in cylinder post injection quantity and to set the fuel injection control signal 150.

At block 240, the desulfurization control module 110 checks whether the total amount of sulfur 136 is less than a lower sulfur threshold and whether a desulfurization duration has elapsed. If the total amount of sulfur 136 is less than the lower sulfur threshold or the desulfurization duration has elapsed, the method terminates at block 220; otherwise, the method proceeds to block 250.

At block 250, the desulfurization control module 110 determines whether an interrupt has been received from the interrupt module 112 based on an interrupt condition 148. If the interrupt is not detected, then the method proceeds to block 230; otherwise, the interrupt is handled and the method terminates at block 220. Based on the interrupt condition 148, the desulfurization is halted and prevented from resuming until one or more of: a next regeneration of the PF device 36 and a next desulfurization request 124.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An exhaust gas treatment system for an internal combustion engine to control desulfurization of at least one aftertreatment device, comprising:
    a desulfurization mode trigger module configured to set a desulfurization request based on one or more trigger conditions, wherein the one or more trigger conditions comprise one or more of: an engine operating time exceeding an engine operating time threshold; an amount of fuel consumed exceeding a fuel consumption threshold; a distance traveled exceeding a distance traveled threshold; and a number of particulate filter device regenerations exceeding a regeneration threshold;
    a desulfurization control module configured to control desulfurization of the at least one aftertreatment device based on the desulfurization request; and
    an interrupt module configured to interrupt the desulfurization of the at least one aftertreatment device based on an interrupt condition.

2. The exhaust gas treatment system as recited in claim 1, further comprising:
    a stored sulfur model configured to determine a total amount of sulfur stored in the at least one aftertreatment device as a combined sulfur adsorption and desorption value, wherein the one or more trigger conditions further comprise a determination that the total amount of sulfur stored exceeds an upper sulfur threshold.

3. The exhaust gas treatment system as recited in claim 2, wherein the desulfurization control module is further configured to control desulfurization of the at least one aftertreatment device until one or more of: the interrupt module interrupts the desulfurization; the total amount of sulfur stored is less than a lower sulfur threshold; and a desulfurization duration elapses.

4. The exhaust gas treatment system as recited in claim 1, wherein the at least one aftertreatment device comprises a selective catalytic reduction device, and the one or more trigger conditions further comprise detection of a pending selective catalytic reduction performance fault.

5. The exhaust gas treatment system as recited in claim 1, wherein the desulfurization control module initiates the desulfurization concurrently with or immediately succeeding regeneration of a particulate filter device in the exhaust gas treatment system.

6. The exhaust gas treatment system as recited in claim 5, wherein the desulfurization control module schedules the desulfurization to occur based on a subsequent regeneration of the particulate filter device after the desulfurization request.

7. The exhaust gas treatment system as recited in claim 5, wherein the one or more trigger conditions comprises one or more of an elapsed regeneration time exceeding a regeneration time threshold and a soot load of the particulate filter device exceeding a soot load threshold, wherein the desulfurization is performed concurrently with the regeneration of the particulate filter device.

8. The exhaust gas treatment system as recited in claim 5, wherein based on the interrupt condition, the desulfurization is halted and prevented from resuming until one or more of: a next regeneration of the particulate filter device and a next desulfurization request.

9. The exhaust gas treatment system as recited in claim 1, wherein the at least one aftertreatment device is at least one of: an oxidation catalyst device ("OC") and a selective catalytic reduction device ("SCR"), and the desulfurization is performed using in-cylinder post injection.

10. A method for controlling desulfurization of at least one aftertreatment device in an exhaust gas treatment system of an internal combustion engine, the method comprising:
    initiating a desulfurization request based on one or more trigger conditions, wherein the one or more trigger conditions comprise one or more of: an engine operating time exceeding an engine operating time threshold; an amount of fuel consumed exceeding a fuel consumption threshold; a distance traveled exceeding a distance traveled threshold; and a number of particulate filter device regenerations exceeding a regeneration threshold;
    controlling desulfurization of the at least one aftertreatment device based on the desulfurization request; and
    interrupting the desulfurization of the at least one aftertreatment device based on an interrupt condition.

11. The method as recited in claim 10, further comprising:
    determining a total amount of sulfur stored in the at least one aftertreatment device as a combined sulfur adsorption and desorption value, wherein the one or more trigger conditions further comprise a determination that the total amount of sulfur stored exceeds an upper sulfur threshold.

12. The method as recited in claim 11, further comprising:
    controlling desulfurization of the at least one aftertreatment device until one or more of: the desulfurization is interrupted; the total amount of sulfur stored is less than a lower sulfur threshold; and a desulfurization duration elapses.

13. The method as recited in claim 10, wherein the at least one aftertreatment device comprises a selective catalytic reduction device, and the one or more trigger conditions further comprise detection of a pending selective catalytic reduction performance fault.

14. The method as recited in claim 10, further comprising:
    initiating the desulfurization concurrently with or immediately succeeding regeneration of a particulate filter device in the exhaust gas treatment system.

15. The method as recited in claim 14, further comprising:
    scheduling the desulfurization to occur based on a subsequent regeneration of the particulate filter device after the desulfurization request.

16. The method as recited in claim 14, wherein the one or more trigger conditions comprises one or more of an elapsed regeneration time exceeding a regeneration time threshold and a soot load of the particulate filter device exceeding a soot load threshold, wherein the desulfurization is performed concurrently with the regeneration of the particulate filter device.

17. The method as recited in claim 14, wherein based on the interrupt condition, the desulfurization is halted and prevented from resuming until one or more of: a next regeneration of the particulate filter device and a next desulfurization request.

18. The method as recited in claim 10, wherein the at least one aftertreatment device is at least one of: an oxidation catalyst device ("OC") and a selective catalytic reduction device ("SCR"), and the desulfurization is performed using in-cylinder post injection.

19. An exhaust gas treatment system for an internal combustion engine to control desulfurization of at least one aftertreatment device, comprising:
- a desulfurization mode trigger module configured to set a desulfurization request based on one or more trigger conditions;
- a desulfurization control module configured to control desulfurization of the at least one aftertreatment device based on the desulfurization request, wherein the desulfurization control module initiates the desulfurization concurrently with or immediately succeeding regeneration of a particulate filter device in the exhaust gas treatment system; and
- an interrupt module configured to interrupt the desulfurization of the at least one aftertreatment device based on an interrupt condition.

* * * * *